(12) United States Patent
Harries

(10) Patent No.: US 6,658,951 B2
(45) Date of Patent: Dec. 9, 2003

(54) HYDRAULIC ACTUATION SYSTEMS

(75) Inventor: David Anthony Harries, Stratford upon Avon (GB)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/074,588

(22) Filed: Feb. 12, 2002

(65) Prior Publication Data

US 2002/0119864 A1 Aug. 29, 2002

(30) Foreign Application Priority Data

Feb. 12, 2001 (GB) ............................................. 0103312

(51) Int. Cl.$^7$ ................................................ F16H 6/26
(52) U.S. Cl. .................................... 74/336 R; 192/3.57
(58) Field of Search ................................ 74/335, 336 R; 477/70, 79; 192/3.57, 3.58, 3.63

(56) References Cited

U.S. PATENT DOCUMENTS

| | | | | |
|---|---|---|---|---|
| 4,784,007 A | * | 11/1988 | Ishida et al. ................... | 74/335 |
| 4,821,607 A | * | 4/1989 | Kawai ....................... | 74/336 R |
| 5,072,814 A | * | 12/1991 | Hama et al. ................ | 192/3.57 |
| 5,083,646 A | * | 1/1992 | Takeuchi et al. ............ | 192/3.57 |
| 5,667,044 A | * | 9/1997 | Choi ............................. | 74/335 |
| 5,950,780 A | * | 9/1999 | Reik et al. .................. | 192/3.58 |

FOREIGN PATENT DOCUMENTS

| EP | 0101 220 | 7/1983 |
|---|---|---|
| EP | 0043 660 | 4/1986 |
| EP | 0038 113 | 7/1986 |
| EP | 0 059 035 | 1/1987 |
| GB | 0024999.5 | 10/2000 |
| GB | 0025000.1 | 10/2000 |
| WO | WO 92/13208 | 8/1992 |
| WO | WO 97/05410 | 2/1997 |
| WO | WO 97/40300 | 10/1997 |

\* cited by examiner

*Primary Examiner*—Sherry Estremsky
(74) *Attorney, Agent, or Firm*—Darby & Darby

(57) ABSTRACT

A hydraulic actuation system for an automated transmission system including an active clutch includes; a hydraulic clutch actuator controlling engagement of the clutch, the hydraulic control actuator being preloaded towards a disengaged position of the clutch, whereby pressure above a first predetermined value is required in order to move the clutch to a predetermined position; first and second gear engagement actuators for controlling the selection and engagement of a selected gear ratio; a source of hydraulic fluid under pressure, a hydraulic fluid reservoir; a clutch control valve for selectively connecting the clutch actuator to the source of hydraulic fluid under pressure or to the reservoir; a gear engagement control valve for selectively connecting each gear engagement actuator to the source of hydraulic fluid under pressure or to the reservoir; and a changeover valve situated between the gear engagement control valve and the first and second gear engagement actuators, said changeover valve in a first position connecting the first gear engagement actuator to the gear engagement control valve and the second gear engagement actuator to the reservoir and, in a second position, connecting the second gear engagement actuator to the gear engagement control valve and the first gear engagement actuator to the reservoir, the changeover valve being shifted from its first position to its second position when pressure in the clutch actuator rises above a second predetermined value, the second predetermined value being lower than the first predetermined value.

20 Claims, 9 Drawing Sheets

HYDRAULIC ACTUATION SYSTEMS

TECHNICAL FIELD

This invention relates to hydraulic actuation systems and in particular hydraulic actuation systems for automated transmission systems.

BACKGROUND

In automated transmission systems of, for example, the type disclosed in WO97/05410, WO97/40300 or GB 0028310.1, whose content is expressly incorporated in the disclosure content of the present application, fluid pressure actuators are used to control actuation of a clutch actuator mechanism and/or a gear engagement mechanism. WO97/05410 and WO97/40300 disclose automated transmission systems including clutch means, in which the clutch means is normally held in the engaged condition by mechanical spring means, hydraulic actuators being provided to release the clutch means. WO97/05410 discloses a hydraulic control system in which separate valves are used to control the clutch actuator mechanism and the gear engagement mechanism. WO97/40300 discloses an integrated control system in which a main control valve controls both the clutch actuation mechanism and, together with secondary valves, shift and select actuators of a gear engagement mechanism.

GB0028310.1 discloses an automated transmission system utilising an active clutch which is normally disengaged and is held in engagement by hydraulic pressure. It is advantageous with hydraulic actuators for active clutches to preload the clutch to the disengaged position, so that a predetermined threshold pressure, typically of the order of 10 bar, is required before the clutch will reach the touch point, that is the point at which the clutch begins to transmit torque. In this manner, at the touch point on disengagement of the clutch, there is sufficient pressure remaining in the system to give rapid exhaust of fluid from the clutch actuator and so ensure that there is no clutch drag.

In the hydraulic actuation system disclosed in GB 0028310.1, a pair of gear engagement actuators are used to control selection and engagement of gear ratios associated with the clutch, each gear engagement actuator requiring a separate solenoid operated control valve.

SUMMARY

The present invention provides a hydraulic actuation system in which a pair of gear engagement actuators may be controlled by a single solenoid operated control valve, thereby reducing the number of solenoid operated control valves required in the control system and simplifying the electronic control circuitry.

According to one aspect of the present invention a hydraulic actuation system for an automated transmission system including an active clutch comprises:— a hydraulic clutch actuator controlling engagement of an active clutch, the hydraulic control actuator being preloaded towards a disengaged position of the clutch, whereby pressure above a first predetermined value is required in order to move the clutch to a predetermined position;

first and second gear engagement actuators for controlling the selection and engagement of a selected gear ratio;

a source of hydraulic fluid under pressure;

a hydraulic fluid reservoir;

a clutch control valve for selectively connecting the clutch actuator to the source of hydraulic fluid under pressure or to the reservoir;

a gear engagement control valve for selectively connecting each gear engagement actuator to the source of hydraulic fluid under pressure or to the reservoir; and a changeover valve situated between the gear engagement control valve and the first and second gear engagement actuators, said changeover valve in a first position connecting the first gear engagement actuator to the gear engagement control valve and the second gear engagement actuator to the reservoir and, in a second position, connecting the second gear engagement actuator to the gear engagement control valve and the first gear engagement actuator to the reservoir, the changeover valve being shifted from its first position to its second position when pressure in the clutch actuator rises above a second predetermined value, the second predetermined value being lower than the first predetermined value.

The predetermined position of the clutch is a position intermediate of the fully released position and the touch point at which the clutch begins to transmit torque and is preferably at or near to the touch point.

A hydraulic actuating system according to the present invention may be used to control the clutch of a single clutch transmission system. Alternatively, two similar hydraulic actuation systems may be used in parallel to control the clutches of a twin clutch transmission system.

According to a further aspect of the present invention, a proportional pressure control valve may be used to control pressure of fluid supplied from the source of hydraulic fluid under pressure to the gear engagement control valve, so that the forces exerted on the gear engagement mechanism may be controlled.

BRIEF DESCRIPTION OF THE DRAWING FIGURES

The invention is now described by way of example only, with reference to the accompanying drawings, in which.

DETAILED DESCRIPTION OF PREFERRED EMBODIMENTS

Figure 1:
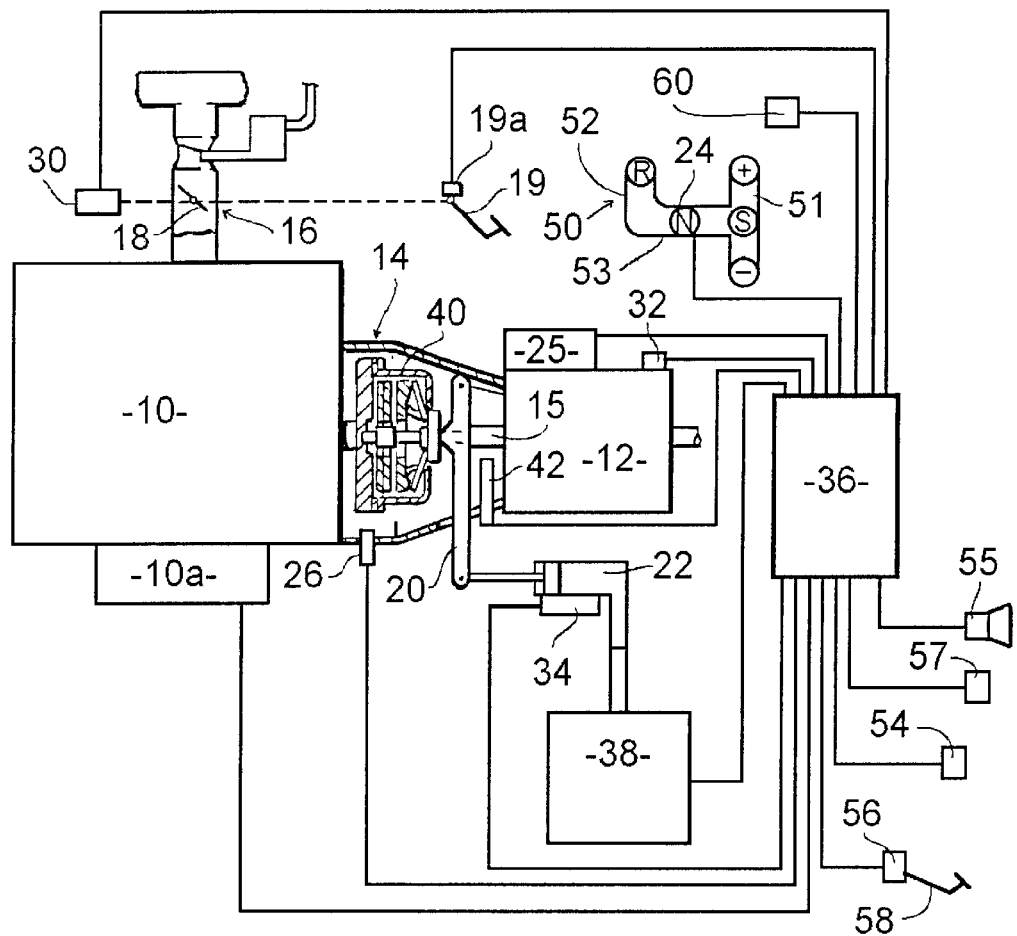
FIG. 1 shows diagrammatically a semi-automated transmission system utilising a hydraulic actuation system in accordance with the present invention.

FIG. 1 of the accompanying drawings shows an engine 10 with a starter and associated starter circuit 10a which is coupled through the main drive friction clutch 14 to a multi-speed synchromeshed lay shaft-type gearbox 12, via a gearbox input shaft 15. Fuel is supplied to the engine by a throttle 16 which includes a throttle valve 18, operated by accelerator pedal 19. The invention is equally applicable to electronic or mechanical fuel injection petrol or diesel engines.

The clutch 14 is actuated by a fork 20 which is operated by a hydraulic slave cylinder 22, under the control of a clutch actuator control means 38. The clutch 14 is an active clutch, plates of the clutch 14 being urged apart by mechanical spring means, the load applied by the spring means being opposed by pressurisation of the clutch slave cylinder 22 to urge the plates into frictional engagement and engage the clutch 14 so that it will transmit torque.

A gear selector lever 24 operates in a gate 50 having two limbs 51 and 52 joined by a cross track 53 extending between the end of limb 52 and intermediate of the ends of limb 51. The gate 50 defines five positions; "R" at the end of limb 52; "N" intermediate of the ends of the cross track 53; "S" at the junction of limb 51 with the cross track 53; and "+" and "−" at the extremities of limb 51. In limb 51 the lever 24 is biased to the central "S" position. The "N" position of the selector lever 24 corresponds to neutral; "R" corresponds to selection of reverse gear; "S" corresponds to selection of a forward drive mode; momentary movement of the lever to the "+" position provides a command to cause the gearbox to shift up one gear ratio; and momentary movement of the gear lever 24 to the "−" position provides a command to cause the gearbox to shift down one gear ratio.

The positions of the lever 24 are sensed by a series of sensors, for example micro switches or optical sensors, positioned around the gate 50. Signals from the sensors are fed to an electronic control unit 36. An output from the control unit 36 controls a gear engaging mechanism 25, which engages the gear ratios of the gearbox 12, in accordance with movement of the selector lever 24 by the vehicle operator.

In addition to signals from the gear selector lever 24, the control unit 36 receives signals from:

sensor 19a indicative of the degree of depression of the accelerator pedal 19;

sensor 30 indicative of the degree of opening of the throttle control valve 18;

sensor 26 indicative of the engine speed;

sensor 42 indicative of the speed of the clutch driven plate; and sensor 34 indicative of the clutch slave cylinder position.

The control unit 36 utilises the signals from these sensors to control actuation of the clutch 14 during take-up from rest and gear changes, for example as described in patent specifications EP0038113, EP0043660, EP0059035, EP0101220 and WO92/13208 whose content is expressly incorporated in the disclosure content of the present application.

In addition to the above mentioned sensors, control unit 36 also receives signals from a vehicle speed sensor 57, ignition switch 54 and brake switch 56 associated with the main braking system, for example the footbrake 58 of the vehicle.

A buzzer 55 is connected to the control unit 36 to warn/indicate to the vehicle operator as certain operating conditions occur. In addition or in place of the buzzer 55 a flashing warning light or other indicating means may be used. A gear indicator 60 is also provided to indicate the gear ratio selected.

Figure 2:
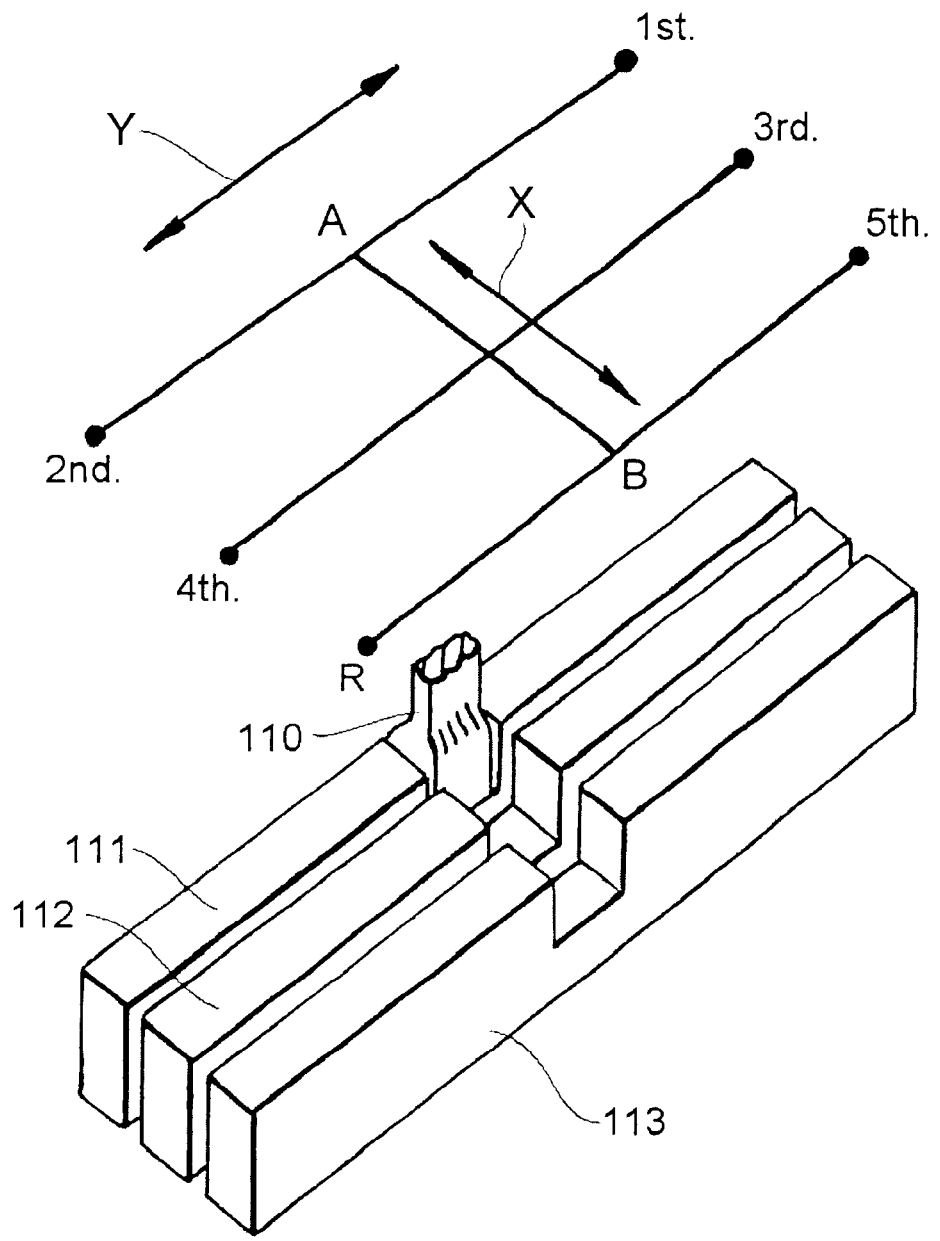
FIG. 2 shows a gear selector mechanism and associated selector gate of the transmission system illustrated in FIG. 1.

As illustrated in FIG. 2, the gear engagement mechanism 25 comprises three shift rails 111, 112, 113 mounted parallel to one another for movement in an axial direction. Each shift rail 111, 112, 113 is associated with two of the gear ratios of the gearbox 12, via a selector fork and synchromesh unit in conventional manner, so that movement of the shift rails 111, 112, 113 in one axial direction will cause engagement of one of the associated gear ratios and axial movement of the shift rail 111, 112, 113 in the opposite axial direction will cause engagement of the other associated gear ratio.

Typically; first and second gear ratios are associated with shift rail 111, so that axial movement of the shift rail 111 in a first direction will engage first gear or axial movement of shift rail 111 in a second direction will engage second gear; third and fourth gear ratios are associated with shift rail 112, so that axial movement of shift rail 112 in the first direction will engage third gear or axial movement of shift 112 in a second direction will engage fourth gear; and fifth and reverse gear ratios are associated with shift rail 113, so that axial movement of shift rail 113 in the first direction will engage fifth gear while axial movement of shift rail 113 in the second direction will engage reverse gear.

A selector member 110 is mounted for movement in a select direction X transverse to the axes of the shift rails 111, 112, 113 and in a shift direction Y, for movement axially of the shift rails 111, 112 and 113. The selector member 110 may thus be moved in direction X along a neutral plane A-B, so that it may be indexed with and engaged a selected one of the shift rails 111, 112 and 113. The selector member 110 may then be moved in direction Y to move the engaged shift rail 111, 112, 113 axially in either direction to engage one of the gear ratios associated therewith.

Figure 3:
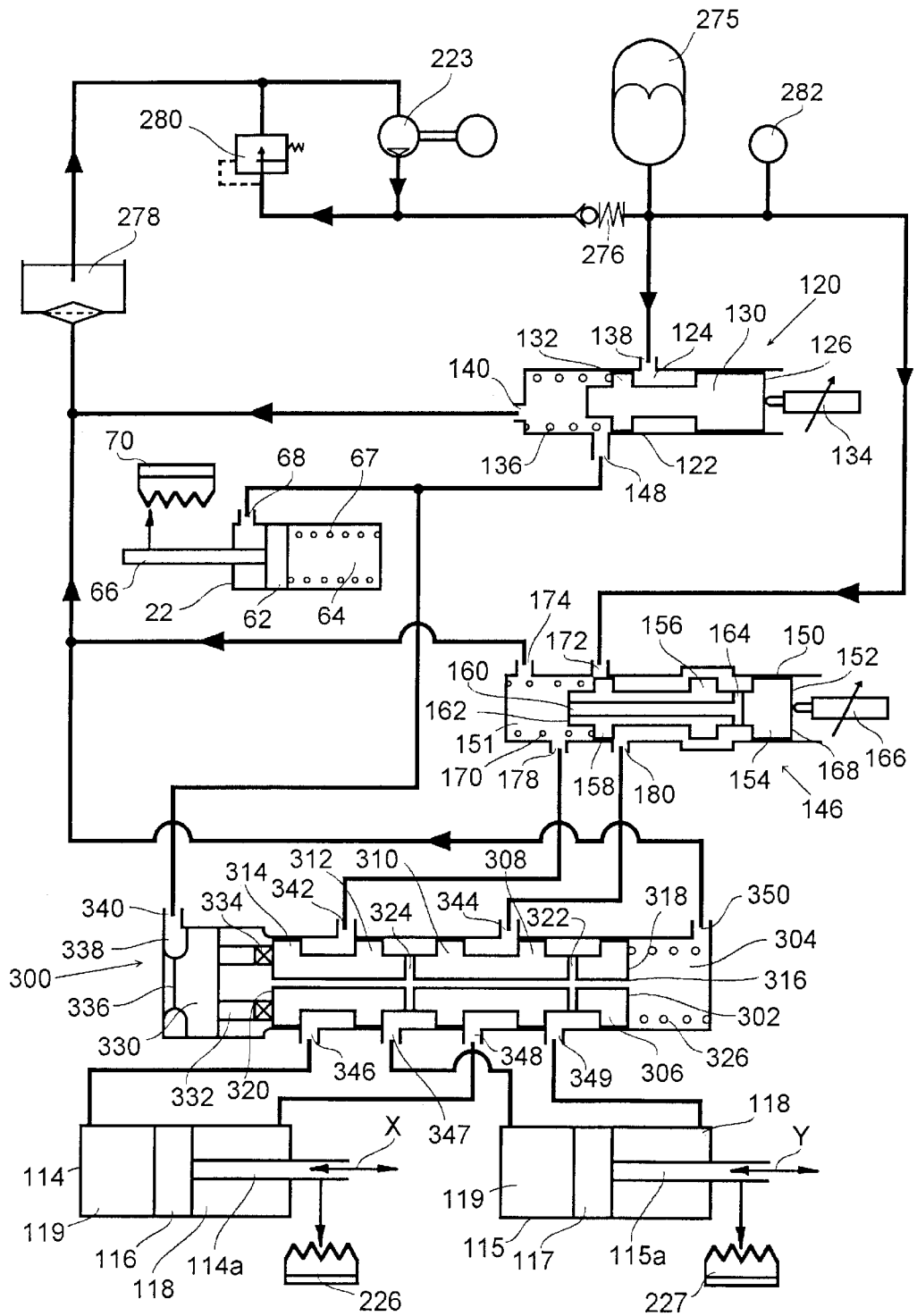
FIG. 3 illustrates diagrammatically the hydraulic actuation system of the transmission system illustrated in FIG. 1.

As illustrated in FIG. 3, selector member 110 is movable in the select direction X by means of a fluid pressure operated select actuator 114, along the neutral plane A-B of the gate illustrated in FIG. 2, to align the selector member 110 with one of the shift rails 111, 112, 113, and thereby select a pair of gears associated with that shift rail. The selector member 110 may then be moved in the shift direction Y by means of a fluid pressure operated shift actuator 115, to move the shift rail 111, 112, 113 axially in either direction to engage one of the gear ratios associated therewith.

The actuators 114 and 115 each comprise a double-acting ram having pistons 116, 117 respectively, which divide the actuators 114,115 into two working chambers 118,119, the working chambers 118,119 being disposed on opposite sides of each of the pistons 116,117. Operating rods 114a,115a extend from one side of the pistons 116,117 respectively and are operatively connected with the selector member 110 for movement thereof in the select and shift directions X and Y respectively. As a consequence of the connection of operating rods 114a,115a to the pistons 116,117, the working area of pistons 116,117 exposed to working chamber 118 is smaller than the working area of pistons 116,117 exposed to working chamber 119.

A solenoid operated clutch control valve 120 comprises a housing 122, defining a bore 124. A spool 126 is slideably located in the bore 124, the spool 126 having two axially spaced circumferential lands 130, 132 which sealingly engage the bore 124. A solenoid 134 acts on one end of the spool 126, so that upon energisation of the solenoid 134, the spool 126 is moved axially of the bore 124 against a load applied by a compression spring 136, acting on the opposite end of the spool 126.

An inlet 138 to the bore 124 of valve 120 is connected to an accumulator 275. An electrically-driven pump 223 is provided to charge the accumulator 275 via a non-return valve 276. A pressure transducer 282 is provided between the accumulator 275 and inlet 138 of the clutch control valve 120 to measure the accumulator pressure and send signals corresponding thereto to the control unit 36. A pressure release valve 280 is provided between the outlet from the pump 223 and a reservoir 278 to ensure that the pressure supplied by the pump 223 does not exceed a maximum predetermined value.

An outlet 140 from the bore 124 of clutch control valve 120 is connected to the reservoir 278. A port 148 from bore 124 is connected to the clutch slave cylinder 22. The clutch slave cylinder 22 comprises a piston 62 slidably mounted in a cylinder 64. An actuating rod 66 extends from one side of the piston 62 and is connected to the fork 20 so as to apply pressure to the plates of clutch 14 to engage the clutch when the actuating rod 66 is retracted into the cylinder 64. A helical compression spring 67 acts on the side of the piston 62 remote from the actuating rod 66, biasing the piston 62 to the left as illustrated in FIG. 3. The spring 67 is arranged to apply a load to the piston 62 when the clutch 14 is at its touch point, which is equivalent to a pressure in excess of a first predetermined value which may typically be of the order of 10 bar. Port 148 of the clutch control valve 120 is connected to the cylinder 64 of the slave cylinder 22, on the side of the piston 62 from which connecting rod 66 extends, by port 68.

A solenoid operated gear engagement control valve 146 has a housing 150 defining a bore 151 with a spool 152 slideably mounted in the bore 151. The spool 152 has three axially spaced circumferential lands 154, 156, 158, the lands sealingly engaging the bore 151. An axial bore 160 opens to end 162 of the spool 152 and connects to a cross-bore 164, the cross-bore 164 opening between lands 154 and 156 of the spool 152. A solenoid 166 acts on end 168 of spool 152 remote from the end 162, so that upon energisation of the solenoid 166, the spool 152 will move axially in the bore 151 against a load applied by a compression spring 170 acting on end 162 of the spool 152.

An inlet 172 to the bore 151 is connected to the accumulator 275. An outlet 174 from the bore 151 is connected to the reservoir 278. A first port 178 of the valve 146 is connected to a port 342 of a changeover valve 300 and a second port 180 is connected to the port 344 of a changeover valve 300.

The changeover valve 300 comprises a spool 302 which is slidably mounted in a closed bore 304. The spool 302 has five axially separated land formations 306, 308, 310, 312 and 314 of enlarged diameter, which sealingly engage the wall of the bore 304. An axial bore 316 extends from one end 318 to the other end 320 of spool 302, the axial bore 316 connecting with cross bores 322 and 324, which open to the external diameter of the spool 302 between lands 306 and 308 and lands 310 and 312 respectively.

A compression spring 326 acts on the end 318 of spool 302, urging the spool 302 to the left, as illustrated in FIG. 3. A hydraulic piston 330 is provided adjacent the other end 320 of spool 302, so that the spool 302 is biased by spring 326 into engagement with the piston 330. The end of the piston 330 which abuts spool 302 has an axially extending flange formation 332 which is coaxial with axial bore 316 through the spool 302. Slots 334 extend radially through the flange formation 332 to connect the internal and external diameters thereof. The opposite end of piston 330 has an abutment portion 336 of reduced diameter which abuts the closed end of bore 304 and defines a working chamber 338 for the piston 330.

A first port 340 opens to the working chamber 338 and is connected to the working chamber of slave cylinder 22 via port 68. Ports 342 and 344, which are connected to the gear engagement control valve 146, open into the bore 304 of the changeover valve 300. Working chambers 118 of the select and shift actuators 114 and 115 are connected to the bore 304 of the changeover valve 300 via ports 348 and 349 respectively and working chambers 119 of the select and shift actuators 114 and 115 are connected to the bore 304 of the changeover valve 300, via ports 346 and 347 respectively. An outlet 350 connects the bore 304, adjacent end 318 of spool 302, to the reservoir 278.

The spring 326 is preloaded so that the spool 302 of the changeover valve 300 will remain in the position illustrated in FIG. 3, until the pressure applied to the slave cylinder 22 rises above a second predetermined value, typically of the order of 3 bar, that is below the first predetermined value which is required to move the slave cylinder 22 to a position corresponding to the touch point of the clutch. In this position, the working chamber 118 of the select actuator 114 is connected via ports 348 and 344 to port 180 of the gear engagement control valve 146; working chamber 119 of the select actuator 114 is connected via ports 346 and 342 to port 178 of the gear engagement control valve 146; working chamber 118 of shift actuator 115 is connected to reservoir 278 via port 349, cross bore 322, axial bore 316 and outlet 350; and working chamber 119 of shift actuator 115 is connected to reservoir 278 via port 347, cross bore 324, axial bore 316 and outlet 350.

Figure 9:
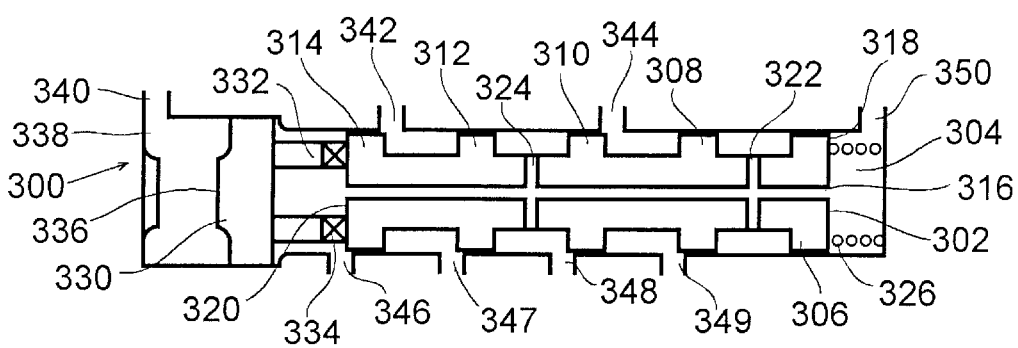
FIG. 9 shows a sectional diagrammatic illustration of the changeover valve of the hydraulic actuation system illustrated in FIG. 3, showing the position of the changeover valve when the clutch actuator is pressurised above a second predetermined value.

When the pressure in the slave cylinder 22 rises above the second predetermined value, the spool 302 is displaced by piston 330 to the position illustrated in FIG. 9 in which; working chamber 118 of the select actuator 114 is connected to reservoir 278, via port 348, cross bore 324, axial bore 316 and outlet 350; working chamber 119 of the select actuator 114 is connected to reservoir 278 via port 346, slots 334, axial bore 316 and outlet 350; working chamber 118 of the shift actuator 115 is connected to port 180 of the gear engagement control valve 146 via ports 349 and 344 of changeover valve 300; and working chamber 119 of the shift actuator 115 is connected to port 178 of the gear engagement control valve 146, via ports 347 and 342 of the changeover valve 300.

When the hydraulic system is switched off, the solenoids 134 and 166 will be de-energised and valves 120 and 146 will be in the rest positions illustrated in FIG. 3. In this position the clutch slave cylinder 22 is connected via port 148 and outlet 140 of the clutch control valve 120 to the reservoir 278 and the clutch 14 is disengaged. Moreover, as the pressure in the slave cylinder 22 will be below the second predetermined value, the changeover valve 300 will be in the position illustrated in FIG. 3, with working chamber 118 and 119 of the shift actuator 115 connected to reservoir 278. Furthermore, working chamber 118 of the select actuator 114 will be connected to the reservoir via ports 348 and 344 of the changeover valve 300 and via port 180, passageways 164 and 160 and outlet 174 of the gear engagement control valve 146; and working chamber 119 of the select actuator 114 will be connected to reservoir 278 via ports 346 and 342 of the changeover valve 300 and via ports 178 and 174 of the gear engagement control valve 146. There will consequently be no movement of the clutch slave cylinder 22 or the select and shift actuators 114,115.

When starting from rest with the vehicle in neutral and solenoids 134 and 166 de-energised as illustrated in FIG. 3, engagement of a take-up gear, for example first gear, may be initiated upon movement of the gear selector lever 24 to the drive position 'S' or reverse which may be initiated upon movement of the gear selector lever 24 to the reverse position 'R'. The solenoid 166 of the gear engagement control valve 146 is energised to move the spool 152 to a third position as illustrated in FIG. 7 or a fourth position as illustrated in FIG. 8.

Figure 7:
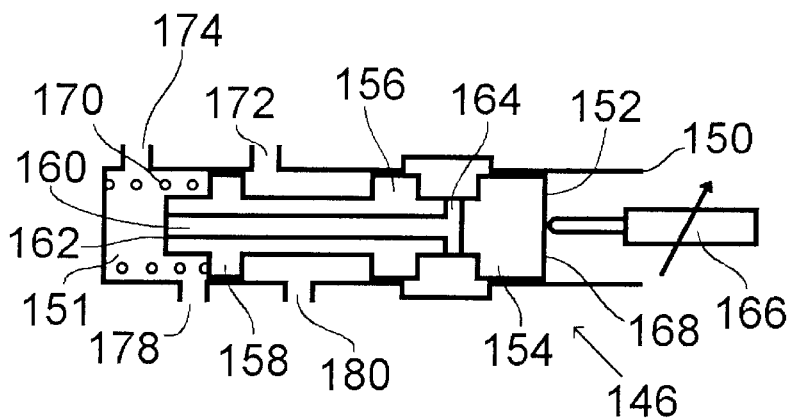
FIG. 7 shows a view similar to FIG. 6 with the gear engagement control valve in an energised third position.
Figure 8:
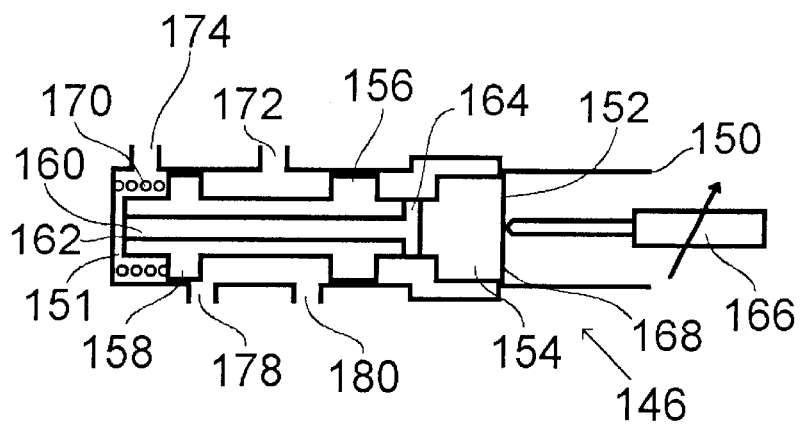
FIG. 8 shows a view similar to FIG. 6 of the gear engagement control valve in an energised fourth position.

In the third position of the gear engagement control valve 146, as illustrated in FIG. 7, the working chamber 118 of the select actuator 114 is connected to the accumulator 275 via ports 348 and 344 of the changeover valve 300 and ports 180 and 172 of the gear engagement control valve 146 and working chamber 119 of the select actuator 114 is connected to the reservoir 278, via ports 346 and 342 of the changeover valve 300 and ports 178 and 174 of the gear engagement control valve 146. The pressure differential thereby created across piston 116 will cause the operating rod 114a of the select actuator 114 to retract, moving to the left as illustrated in FIG. 3. In the fourth position of the gear engagement control valve 146, as illustrated in FIG. 8, both working chambers 118 and 119 of the select actuator 114 are connected to the accumulator 275, chamber 118 via ports 348 and 344 of changeover valve 300 and ports 180 and 172 of valve 146 and chamber 119 via ports 346 and 342 of changeover valve 300 and ports 178 and 172 of valve 146, the area differential of piston 116 will thereby cause the operating rod 114a of the select actuator 114 to extend, moving to the right as illustrated in FIG. 3.

Figure 6:
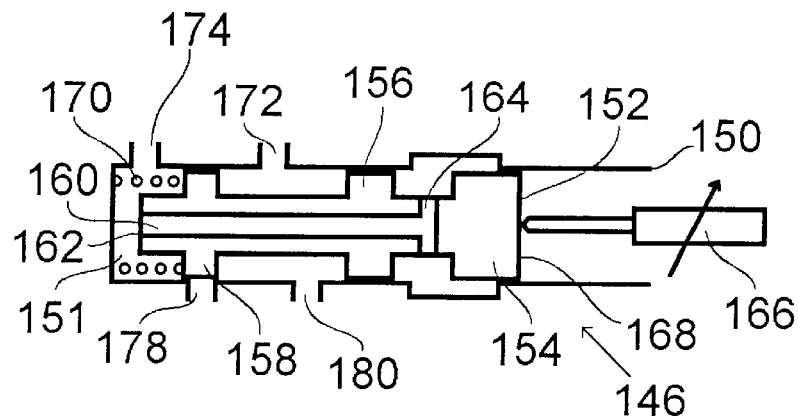
FIG. 6 shows a sectional diagrammatic illustration of the gear engagement control valve of the hydraulic actuation system illustrated in FIG. 3, in an energised null position.

In this manner the select member 110 may be moved along the neutral plane A-B to engage the shift rail 111, 112, 113 appropriate for the selected take-up gear. When the selector member 110 is aligned with the required shift rail 111, 112, 113, the gear engagement control valve 146 is moved to a null position as illustrated in FIG. 6, in which land 158 closes port 178 thereby creating a hydraulic lock and preventing further movement of the piston 116, even though working chamber 118 remains connected to the accumulator 275.

Figure 4:
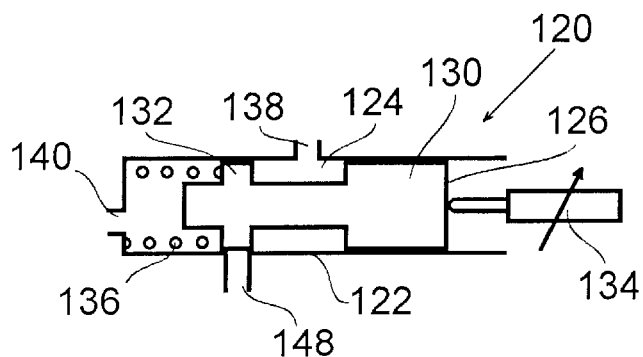
FIG. 4 shows a sectional diagrammatic illustration of the clutch control valve of the hydraulic actuation system illustrated in FIG. 3, in an energised second position.
Figure 5:
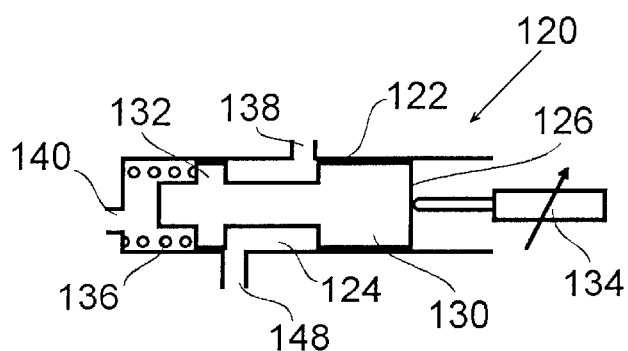
FIG. 5 shows a view similar to FIG. 4 of the clutch control valve in an energised third position.

Solenoid 134 is then energised to move the clutch control valve 120 to the position illustrated in FIG. 5 in which the connection between ports 140 and 148 is closed and port 148 is connected to inlet 138 and the accumulator 275, between lands 132 and 130. Fluid under pressure is thereby delivered to the slave cylinder 22. When pressure in the slave cylinder 22 is above the second predetermined value but below the first predetermined value, so that the changeover valve 300 switches from its first position as illustrated in FIG. 3 to its second position as illustrated in FIG. 9, but the clutch 14 remains disengaged, the energising current to solenoid 134 is reduced, permitting the clutch control valve to move to the position illustrated in FIG. 4, in which land 132 closes port 148, so that the pressure in the slave cylinder 22 is held at this intermediate pressure.

Movement of the changeover valve 300 from its first to its second position opens chambers 118 and 119 of the select actuator 114 to the reservoir 278, so that pressure therein will be released, the select actuator 114 and selector member 110 being held in position by detent means in the selector mechanism. Furthermore, working chambers 118 and 119 are selectively connected to the accumulator 275 or reservoir 278 via the gear engagement control valve 146, and the gear engagement control valve 146 may be used in the manner described above with respect to the select actuator 114, to control the shift actuator 115 to move the selector member 110 axially of the shift rails 111, 112, 113 in the appropriate direction for engagement of the required take-up gear.

Potentiometers 226 and 227 are connected to the operating rods 114a,115a respectively, to provide signals indicative of the position of the associated operating rods. Signals from the potentiometers 226,227 are fed to the control unit 36 to provide an indication of the position of the operating rods 114a,115a, for each of the gear ratios of the gear box 12 and also to indicate the position of the operating rod 114a, when the selector member 110 is in the neutral plane A-B of FIG. 2. The transmission system may thus be calibrated, so that predetermined position signals from the potentiometers 226 and 227 correspond to engagement of each of the gear ratios of the gear box 12.

Measurements from the potentiometers 226 and 227 may thus be used by a closed loop control system to control valve 146, to move the operating rods 114a and 115a, to the predetermined positions to engage the desired gear ratio.

When the take-up gear is selected, the gear engagement control valve 146 is moved to the position illustrated in FIG. 6 to lock the select actuator 115. The solenoid 134 of the clutch control valve 120 is then energised to move it back to the position illustrated in FIG. 5, increasing the pressure in the slave cylinder 22 to engage the clutch 14. Once clutch 14 is fully engaged the clutch control valve 120 is returned to the position illustrated in FIG. 4 to maintain the clutch in engagement. The clutch control valve 120 may be switched between the rest position illustrated in FIG. 3 and third position illustrated in FIG. 5, so that the clutch 14 is re-engaged in a controlled manner, for example as disclosed in EP0038113; EP0043660; EP0059035; EP0101220 or WO92/13208.

A potentiometer 70 is also provided on the slave cylinder 22 to provide an indication of the position of the clutch 14. Signals from this potentiometer 70 are used in a closed feedback loop to control re-engagement of the clutch 14 and furthermore to control the clutch control valve 120 to provide the intermediate pressure position which is required during gear engagement.

The gear engagement control valve 146 may now be de-energised to move it back to the position illustrated in FIG. 3 and to dump pressure from chambers 118 and 119 of the shift actuator 115 back to the reservoir 278.

The clutch control valve 120 remains energised in the position illustrated in FIG. 4, until a gear change is required or it is required to move to neutral.

Upon implementation of a gear change by movement of the gear selector lever 24 momentarily to the '+' or '−' position or by automatic actuation, solenoid 134 of the clutch control valve 120 is de-energised, so that the spool 126 moves to the position illustrated in FIG. 3, closing the connection between the slave cylinder 22 and accumulator 275 and connecting the slave cylinder 22 to the reservoir 278 via ports 148 and 140 of valve 120. Pressure in the slave cylinder 22 is thereby reduced causing clutch 14 to disengage. When the pressure in the slave cylinder 22 is below the first predetermined value but above the second predetermined value, solenoid 134 is energised to move the clutch control valve 120 to the position illustrated in FIG. 4, thereby maintaining the pressure in the slave cylinder 22 at an intermediate pressure. The changeover valve 300 consequently remains in the position illustrated in FIG. 9 and the gear engagement valve 146 may be moved to the position illustrated in FIGS. 7 or 8 to cause shift actuator 115 to move the selector member 110, in the manner described above, from the position corresponding to the currently engaged gear back to the neutral plane A-B. Solenoid 166 of the gear engagement control valve 146 is then energised to switch the valve 146 to the position illustrated in FIG. 6 and to lock the shift actuator 115.

Solenoid 134 of the clutch control valve 120 is then de-energised, reconnecting the slave cylinder 22 to the reservoir 278 allowing further reduction in pressure in the slave cylinder 22. When pressure in the slave cylinder 22 falls below the second predetermined value, the changeover valve 300 switches to the position illustrated in FIG. 3. The working chambers 118 and 119 of the select actuator 114 are now selectively connected to accumulator 275 or reservoir 278, by gear engagement control valve 146 and a new gear may be selected and subsequently engaged in the manner described above.

Figure 10:
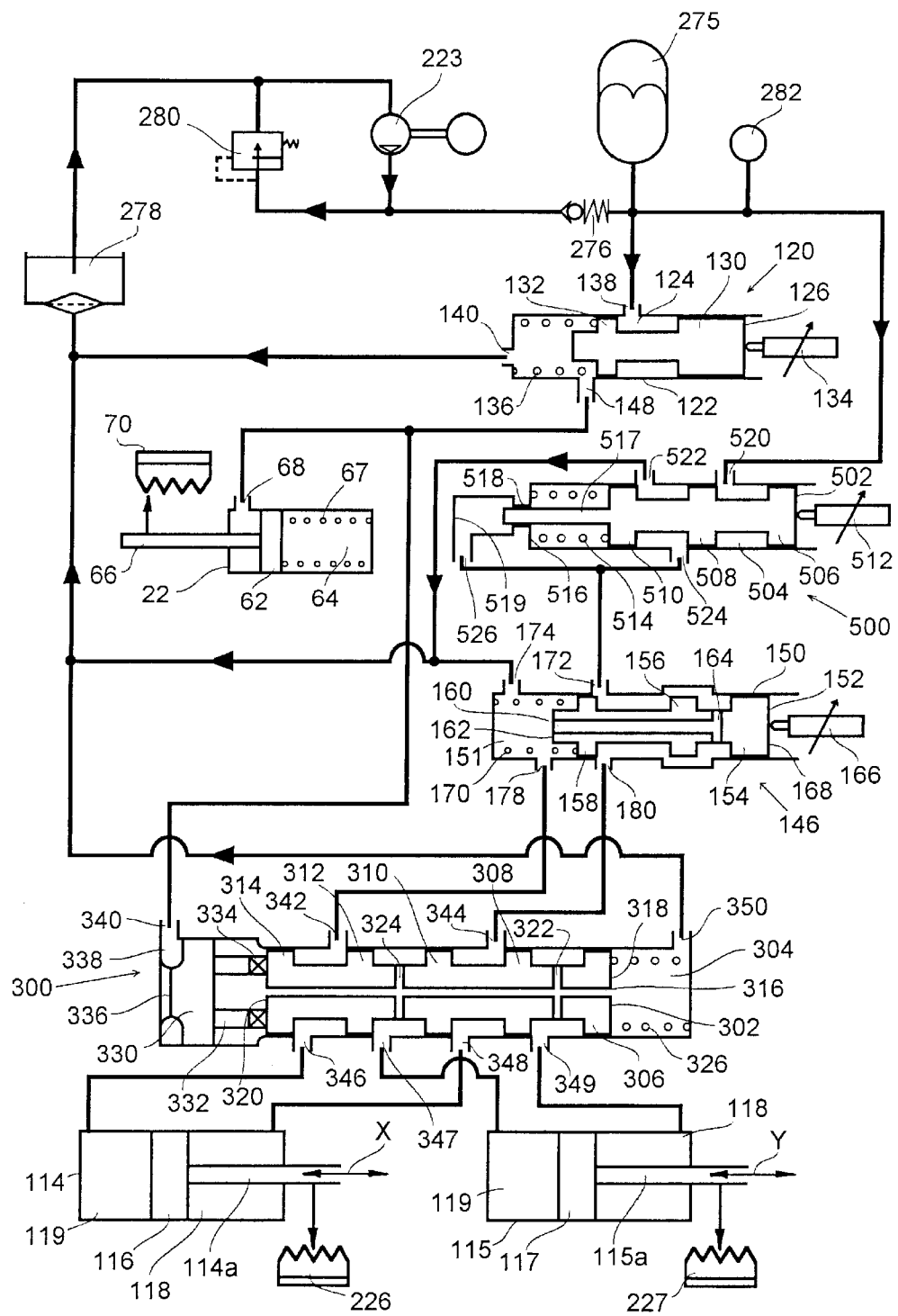
FIG. 10 illustrates diagrammatically a modification to the hydraulic actuation system illustrated in FIG. 3.

In the modification illustrated in FIG. 10, a proportional pressure control valve 500 is provided between the accumulator 275 and the gear engagement control valve 146. The proportional pressure control valve 500 comprises a spool 502 which is slidably located in a closed bore 504. The spool 502 has three lands 506, 508 and 510 of enlarged diameter, which sealingly engage the walls of the bore 504. A solenoid actuator 512 acts on one end of the spool 502 and a helical compression spring 514 acts between the other end of the spool 502 and a shoulder 516 formed in the bore 504. A reduced diameter portion 517 extends from the end of the spool 502 remote from the solenoid actuator 512 and sealingly engages a reduced diameter portion 518 of the bore 504. An inlet 520 to the bore 504 is connected to the accumulator 275; an outlet 522 from the bore 504 is connected to the reservoir 278; a port 524 opening to the bore 504 is connected to the inlet 172 of the gear engagement control valve 146; and a port 526 opening to a closed end 519 of the bore 504 is connected to the port 524. The lands 506, 508, 510, inlet 520, outlet 522 and port 524 are located such that when solenoid 512 is de-energised, as illustrated in FIG. 10, port 524 is connected to outlet 522 between lands 508 and 510, inlet 520 being isolated from port 524 by land 508. In this de-energised position, the inlet 172 of the gear engagement control valve 146 is connected to reservoir 278 and connection to the accumulator 275 is closed by the valve 500.

Energisation of solenoid 512 causes spool 502 to move to the left as illustrated in FIG. 10, against the load applied by spring 514, until the spool 502 reaches a second position in which inlet 520 is connected to port 524 between lands 506 and 508 and outlet 522 is isolated from port 524 by land 508. The gear engagement control valve 146 is thereby connected to the accumulator 275. In addition, accumulator pressure is applied to the end of the reduced diameter portion 517 of spool 502 remote from the solenoid actuator 512, this pressure reinforcing the load applied by spring 514 to oppose the load applied by the solenoid actuator 512. Consequently, as the pressure of fluid supplied by the accumulator 275 to gear engagement control valve 146 increases, the spool 502 will move to the right as illustrated in FIG. 10, until at an intermediate position the land 508 of spool 502 closes the port 524, so that no further fluid can be delivered to the gear engagement control valve 146. At this intermediate position, when the spring load and fluid pressure acting on one end of the spool 502 balance the load applied by the solenoid actuator 512 to the other end of the spool 502, the pressure of fluid supplied to the gear engagement control valve 146 will be proportional to the current energising the solenoid actuator 512. An increase or decrease in the energising current will cause the spool 502 to move to the left or right, increasing or decreasing the pressures applied to the gear engagement control valve 146 and thus to the select and shift actuators 114 and 115. The proportional pressure control valve 500 may thus be used to control the forces that are exerted on the gear engagement mechanism during a gear change.

With the modified hydraulic control system illustrated in FIG. 10, before energising the proportional pressure control valve 500 to effect selection and engagement of a gear, solenoid 166 of the gear engagement control valve 146 is energised to shift the valve 146 to the position illustrated in FIG. 6, thereby locking the select or shift actuator 114, 115 connected thereto by the changeover valve 300. The proportional pressure control valve 500 is then energised to provide the required pressure before moving the gear engagement control valve 146 to one of the positions illustrated in FIGS. 7 and 8, as appropriate.

It will be appreciated that as the pressure proportional valve 500 closes connection to the accumulator 275 when the system is de-energised, there is no need for the gear engagement control valve 146 to do so. Consequently, according to the modified embodiment illustrated in FIG. 10, when solenoid 166 is de-energised, inlet 172 of valve 146 need not be closed and may be connected to port 180 between lands 156 and 158, as illustrated in FIG. 10. Furthermore, according to an alternative embodiment (not shown), port 344 of the changeover valve 300 may be connected directly to port 524 of the proportional pressure control valve 500, bypassing the gear engagement control valve 146. In this manner, when the gear engagement control valve 146 is de-energised, as illustrated in FIG. 3, the working chambers 118 of the select or shift actuators 114 or 115, depending on the position of the changeover valve 300, will be connected to the reservoir 278 via ports 348 or 349 and port 344 of the changeover valve and port 172, cross bore 164, axial bore 160 and outlet 174 of valve 146; and when solenoid 166 of the valve 146 is energised, as shown in FIGS. 6, 7 or 8, the working chamber 118 of the select or shift actuator 114 or 115 will be connected to port 524 of the pressure control valve 500, via ports 348 or 349 and port 344 of the changeover valve 300.

Figure 11:
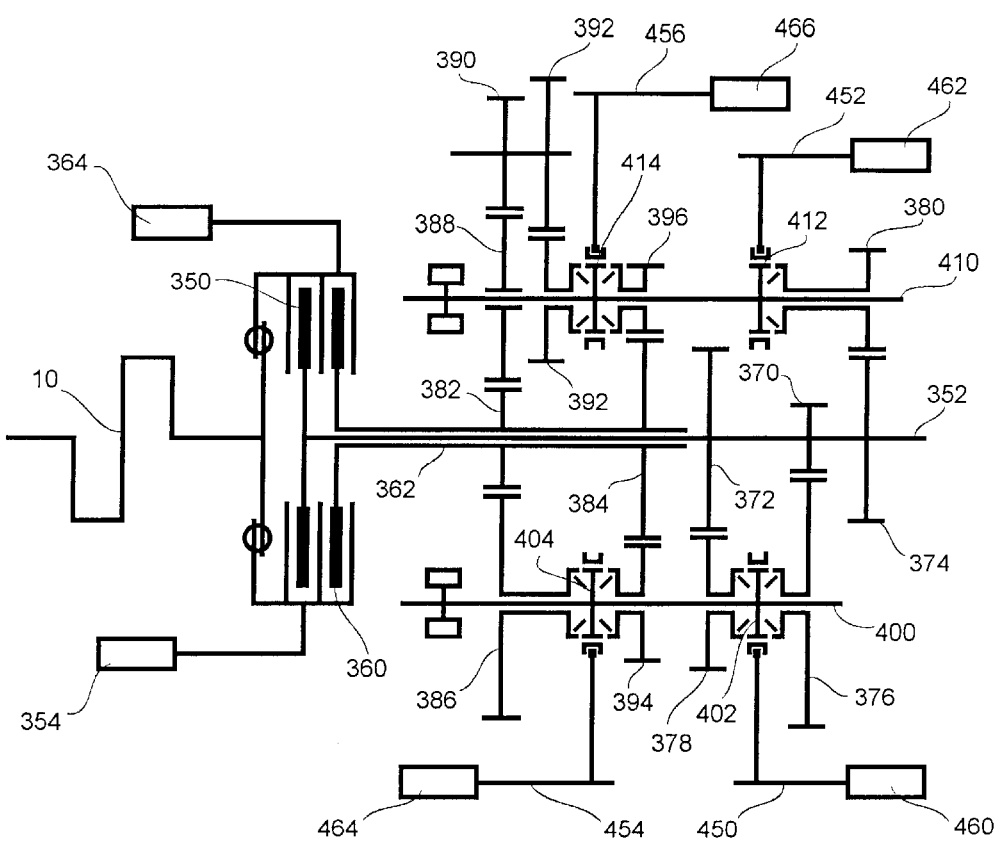
FIG. 11 shows a diagrammatic illustration of a twin clutch transmission system.

In the transmission system illustrated in FIG. 11 a first active clutch 350, when engaged, transmits torque between the output shaft of engine 10 and a first input shaft 352 of the gearbox and a second active clutch 360, when engaged, transmits torque between the output shaft of engine 10 and a second input shaft 362 of the gearbox.

Engagement of clutches 350 and 360 is controlled independently by clutch slave cylinders 354 and 364 respectively, hydraulic pressure being applied to the slave cylinders 354,364 to engage the clutches.

Input shaft 352 has three gears 370, 372, 374 mounted thereon for rotation therewith. Gear 370 meshes with a gear 376 to provide a first gear ratio; Gear 372 meshes with a gear 378 to provide a third gear ratio; and gear 374 meshes with a gear 380 the provide a fifth gear ratio. Input shaft 362 has two gears 382,384 mounted thereon for rotation therewith. Gear 382 meshes with a gear 386 to provide a second gear ratio; and with gear 388, which in turn meshes with gears 390 and 392 to provide a reverse gear ratio. Gear 384 meshes with a gear 394 to provide a fourth gear ratio; and with a gear 396 to provide a sixth gear ratio.

The gears 376, 378, 386 and 394 are mounted on a lay shaft 400 for rotation relative thereto, gears 376 and 378, and gears 386 and 394 being selectively engaged with the lay shaft 400, by means of synchromesh units 402 and 404 respectively, in conventional manner. Gears 380, 392, 388 and 396 are mounted on a lay shaft 410 for rotation relative thereto, gear 380 and gears 392 and 396 being selectively engaged with to lay shaft 410 by means of synchromesh units 412 and 414 respectively.

The synchromesh units 402, 412, 404, 414 are controlled independently by shift rails 450, 452, 454, 456 respectively, the shift rails 450, 452, 454, 456 each being moveable axially from a central neutral position, to either side in order to engage one of the gears associated with the synchromesh unit by means of a shift actuator 460, 462, 464 and 466, respectively.

Clutch 350 may consequently be used to engage the first, third or fifth gear ratio, and clutch 360 may be used to engage the second, fourth, sixth or reverse ratio, by suitable manipulation of the shift actuators 460 and 462; and 464 and 466 respectively. When the transmission is in gear with one of the clutches 450,460 engaged, a gear associated with the disengaged clutch 460,450 may be selected. In order to change gear, the engaged clutch 450,460 is disengaged, the other clutch 460,450 at the same time being engaged, the torque transmitted by the two clutches being balanced to provide a smooth gear change.

Figure 12:
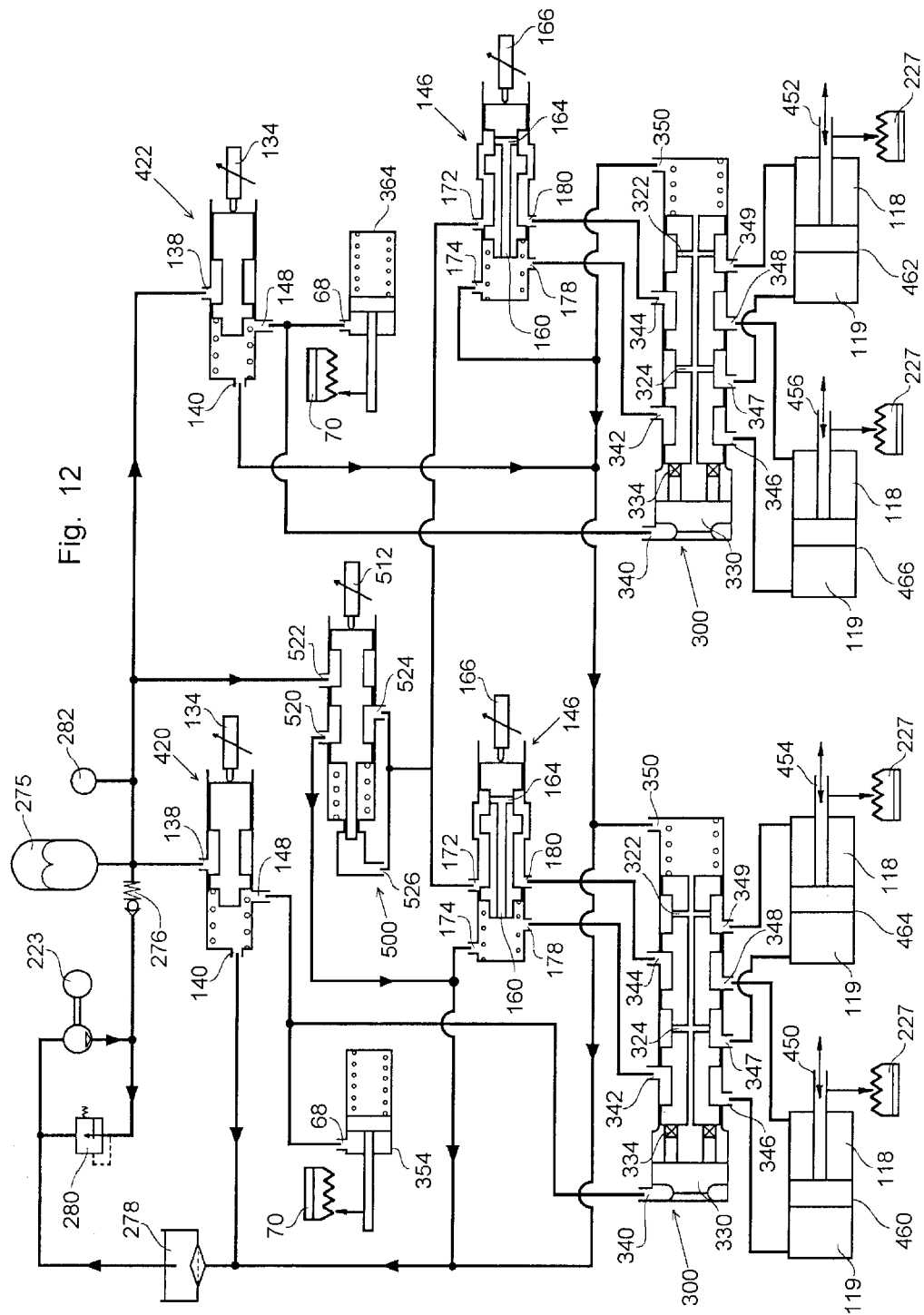
FIG. 12 illustrates diagrammatically a hydraulic actuation system of the transmission system illustrated in FIG. 11.

As illustrated in FIG. 12 the hydraulic actuation system for controlling the twin clutch transmission system disclosed above, with reference to FIG. 11, comprises two circuits substantially as described with reference to FIG. 10, the two circuits being connected in parallel. A common proportional pressure control valve 500 is however used to control pressure of fluid delivered in both circuits to the actuators 460, 462, 464 and 466. The same reference numerals are used for common components and the two circuits operate in the same manner as the circuit described with reference to FIG. 10.

In the hydraulic actuation system illustrated in FIG. 12 shift actuators 460 and 464 are connected to a common gear engagement control valve 146 by means of the changeover valve 300 which is controlled by slave cylinder 354. Shift actuator 460 is connected to the gear engagement control valve 146 when changeover valve 300 is in its first position and shift actuator 464 is connected to the gear engagement control valve 146 when changeover valve 300 is in its second position. Similarly shift actuators 466 and 462 are connected to a common gear engagement control valve 146 by means of the changeover valve 300 which is controlled by slave cylinder 364, shift actuator 466 being connected to the gear engagement control valve 146 when changeover valve 300 is in its first position and shift actuator 462 being connected to the gear engagement control valve 146 when changeover valve 300 is in its second position.

With this configuration when clutch 350 is engaged and clutch 360 disengaged, the changeover valve 300 controlled by slave cylinder 354 will be in its second position and the changeover valve 300 controlled by slave cylinder 364 will be in its first position. As a consequence only gears 2, 4, 6 and reverse which are associated with the disengaged clutch 360 will be available for selection. Conversely when clutch 350 is disengaged and clutch 360 engaged only gears 1,3 and 5 which are associated with the disengaged clutch 350 will be available for selection. This arrangement is advantageous in case of malfunction of the system which may result in the inappropriate energisation of one of the control valves 146.

Other configurations, for example control of shift actuators 460 and 466 with one gear engagement control valve 146 and shift actuators 464 and 462 with the other gear engagement control valve 146 may provide additional or alternative advantages, for example improved limp home facilities in the event that one of the clutches 350,360 or clutch slave cylinders 354,364 fails. The most appropriate hydraulic arrangement will depend on the mechanical configuration of the gear box, but any hydraulic combination is possible to suit.

With a hydraulic control system shown in FIG. 12, at take-up from rest, when solenoids 134,166 and 512 of the clutch control valves 420,422; gear engagement control valves 146 and pressure proportional valve 500 are all de-energised, engagement of an appropriate take-up gear may be effected in the manner described with reference to FIGS. 3 and 10.

With the transmission shown in FIG. 11, when first gear is engaged, the clutch control valve 420 will be in the position illustrated in FIG. 4 with slave cylinder 354 pressurised and hydraulically locked, so that clutch 350 is engaged. Because the pressure in slave cylinder 354 is above the second pre-determined value, the changeover valve 300 associated with shift actuators 460 and 464 is switched to the position illustrated in FIG. 9, connecting shift actuator 464 to the gear engagement control valve 146. Clutch control valve 422 will be in its rest position, as illustrated in FIG. 12, so that the slave cylinder 364 is connected to reservoir 278 and clutch 360 is disengaged. As pressure in the slave cylinder 364 is below the second pre-determined value, changeover valve 300 associated with shift actuators 466 and 462 will be in the position illustrated in FIG. 12, connecting shift actuator 466 to the gear engagement control valve 146 associated therewith.

To change from first gear to second gear, the gear engagement control valves 146 of both circuits are switched to the position illustrated in FIG. 6, thereby hydraulically locking shift actuators 464 and 466. The solenoid 512 of pressure proportional valve 500 is then energised to provide the required pressure. Solenoid 166 of the gear engagement valve 146 associated with shift actuator 464 is then manipulated, as described above, in order to move shift actuator 464 in a direction appropriate to engage second gear. When second gear is engaged, the gear engagement control valve 146 associated with shift actuator 464 is returned to the position illustrated in FIG. 6, to lock the shift actuator 464. Clutch control valve 420 is then de-energised to connect slave cylinder 354 to reservoir 278, thereby allowing clutch 350 to disengage. At the same time clutch control valve 422 is energised to the position illustrated in FIG. 5, thereby connecting slave cylinder 364 to the accumulator 275 and causing clutch 360 to engage. Disengagement of clutch 350 and engagement of clutch 360 is synchronised in order to provide a smooth take-up of drive in second gear.

When clutch 360 is fully engaged, energisation of solenoid 134 of the clutch control valve 422 is reduced to move the valve 422 to the position illustrated in FIG. 4 and hydraulically lock the slave cylinder 364.

The pressure in the slave cylinder 364 may advantageously be maintained at a pressure sufficient to just transmit the currently required torque. Thus any drive line oscillations causing momentary higher torque, induce clutch slip improving the drive comfort. The amount of movement required to disengage the clutch during a subsequent gear change is also reduced.

When pressure in the slave cylinder 354 falls below the second pre-determined pressure, the changeover valve 300 associated with the shift actuators 460,464 returns to the position illustrated in FIG. 12, in which shift actuator 460 is connected to the associated gear engagement control valve 146. The valve 146 may then be controlled as described above, to disengage first gear.

The proportional pressure control valve 500 may then be de-energised closing the connection between gear engagement control valves 146 and the accumulator 275, after which the gear engagement control valves 146 may be returned to their de-energised positions.

For certain gear changes, for example a change from sixth gear to fourth gear, after moving gear engagement control valves 146 to the position illustrated in FIG. 6 in order to hydraulically lock the shift actuators 460 or 464, 466 or 462 connected thereto, slave cylinder 354 or 364 of the disengaged clutch 350 or 360, must first be partially pressurised to a pressure between the first and second pre-determined values, in order to switch the associated changeover valve 300 and thereby connect shift actuator 464 or shift actuator 462, to its associated gear engagement control valve 146.

While in the above embodiment a common proportional pressure control valve 500 is used, separate proportional pressure control valves 500 may be used in each circuit, as described with reference to FIG. 10. In this case, only the circuit controlling the disengaged clutch need be connected to the accumulator in order to engage a new gear and consequently only the gear engagement control valve associated with that circuit need be switched to the position illustrated in FIG. 6.

Alternatively, the hydraulic control system for the twin clutch transmission system shown in FIG. 11 may comprise a pair of circuits as illustrated in FIG. 3, connected in parallel. The pressure applied to the shift actuators 460, 462, 464 and 466 with such circuits may be controlled by suitable manipulation of valves 146, for example by switching the valve rapidly to connect the shift actuator 460, 462, 464, 466 alternately to the accumulator 275 and the reservoir 278; or by other means, for example as disclosed in GB0024999.5; GB0025000.1; GB0025847.5 or GB0025848.3, whose contents is expressly incorporated in the disclosure content of the present application.

With the hydraulic control systems illustrated in FIGS. 3, 10 and 12, the gear engagement actuators may hold the gear in engagement under hydraulic pressure either by maintaining appropriate connection of the gear engagement actuator or by hydraulically locking the gear engagement actuator as described above. However, during clutch engagement, as soon as the pressure exceeds the second predetermined value switching of the changeover valve 300 will connect both sides of the gear engagement actuator to reservoir so that the gear is no longer held in engagement by the actuator, the gear engagement mechanism must then rely on detents in the mechanism to hold the gear in engagement while the clutch is engaged.

Figure 13:
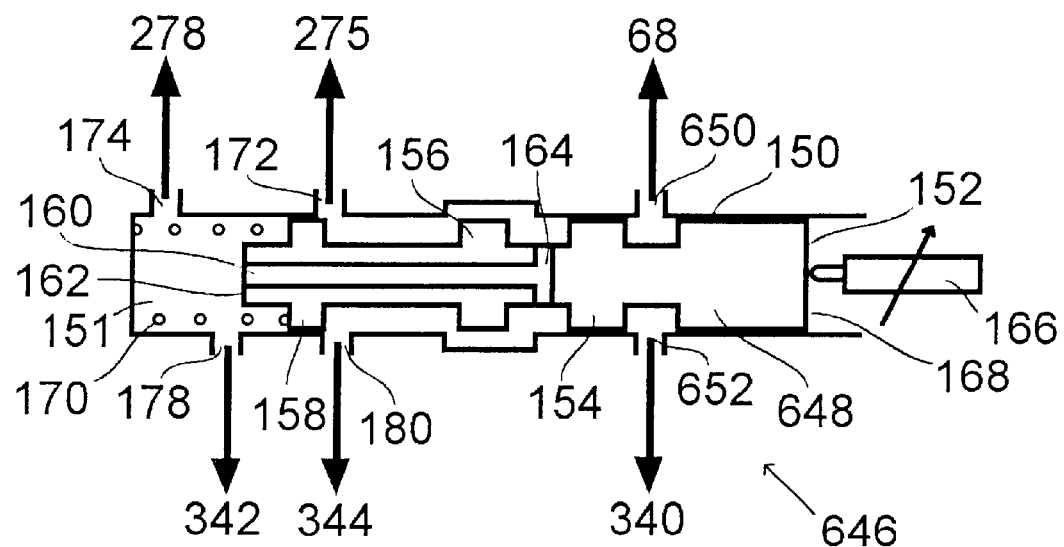
FIG. 13 illustrates diagrammatically a modification to the hydraulic actuation systems illustrated in FIGS. 3, 10 and 12.

In the embodiment illustrated in FIG. 13, port 340 of the changeover valve 300 is connected to port 68 of the clutch slave cylinder 22 via a modified gear engagement control valve 646. In the modified gear engagement control valve 646 an additional land 648 is provided on the spool 152. Further ports 650 and 652 open into the bore 151 of the valve 646, port 650 being connected to port 68 of the slave cylinder 22 and port 652 being connected to port 340 of the changeover valve 300.

When the solenoid actuator 166 of valve 646 is de-energised, as illustrated in FIG. 13, ports 650 and 652 open to one another between lands 648 and 154 of spool 152, so that port 340 of the changeover valve 300 is connected to port 68 of the slave cylinder 22. When solenoid actuator 166 is energised to move the spool 152 to positions corresponding to the positions illustrated in FIGS. 6 to 8, land 648 closes port 650, thereby closing the connection between port 340 of the changeover valve 300 and port 68 of the slave cylinder 22.

With this modified gear engagement valve 646, the changeover valve 300 will not be switched until the gear engagement control valve 646 is de-energised. The engaged gear may consequently be held by hydraulic pressure until the clutch is fully engaged, after which solenoid 166 of the gear engagement control valve 646 may be de-energised.

According to a preferred embodiment of the invention, the bores 124 of the clutch control valves 120, the bores 151 of the gear engagement control valves 146, the cylinders of the select and shift actuators 114,115, the bores 304 of the changeover valves and/or the bores 504 of the proportional pressure control valves 500 may be defined by a common housing, the bores/cylinders of the various components being appropriately inter-connected by passages through the common housing. The valve/actuator pack so formed would be mounted on or adjacent to the gearbox 12.

The electrically driven pump 223, accumulator 275, reservoir 278 and control unit 36 may also be mounted with the valve/actuator pack or may be mounted remotely thereof and inter-connected thereto by, for example, elastomeric pressure hoses.

Various modifications may be made without departing from the invention. For example, while in the above embodiment the hydraulic circuit has been described with reference to a semi-automated transmission system, the invention is equally applicable to fully-automated transmission systems or to automated manual transmission systems.

Moreover while in the embodiment described above the clutch slave cylinder 22 is connected directly to the main control valve 120, a remote displacement valve with position sensing means of the type disclosed in EP 0702760 and GB 0026178.4 whose content is expressly incorporated in the disclosure content of the present application, may be interposed between the main control valve 120 and clutch slave cylinder 22.

The pressure proportional value 500 described above is described by way of example only. Other solenoid operated pressure proportional valves of conventional design, for example in which pressure is delivered to the end of the spool by internal passageways, may alternatively be used.

While in the above embodiments a gas accumulator 275 has been illustrated a spring accumulator which may also define the reservoir 278 as described in GB0024999.5 may alternatively be used.

With a twin clutch transmission, the gears associated with each clutch may be varied, as desired.

The patent claims submitted with the application are proposed formulations without prejudice to the achievement of further patent protection. The applicant reserves the right to submit claims for further combinations of characteristics, previously only disclosed in the description and/or drawings.

References back used in sub-claims refer to the further development of the subject of the main claim by the characteristics of the respective sub-claim; they are not to be understood as a waiver with regard to achieving independent item protection for the combination of characteristics in the related sub-claims.

Since the subject of the sub-claims can form separate and independent inventions with reference to the prior art on the priority date, the applicant reserves the right to make them the subject of independent claims or of division declarations. Furthermore, they may also contain independent inventions which demonstrate a design which is independent of one of the objects of the preceding sub-claims.

The embodiments are not to be considered a restriction of the invention. Rather, a wide range of amendments and modifications is possible within the scope of the current disclosure, especially those variations, elements and combinations and/or materials which, for example, the expert can learn by combining individual ones together with those in the general description and embodiments in addition to characteristics and/or elements or process stages described in the claims and contained in the drawings with the aim of solving a task thus leading to a new object or new process stages or sequences of process stages via combinable characteristics, even where they concern manufacturing, testing and work processes.

What is claimed is:

1. A hydraulic actuation system for an automated transmission system including an active clutch comprising:
    a hydraulic clutch actuator controlling engagement of an active clutch, the hydraulic clutch actuator being preloaded towards a disengaged position of the clutch, whereby pressure above a first predetermined value is required in order to move the clutch to a predetermined position;
    first and second gear engagement actuators for controlling the selection and engagement of a selected gear ratio;
    a source of hydraulic fluid under pressure;
    a hydraulic fluid reservoir;
    a clutch control valve for selectively connecting the clutch actuator to the source of hydraulic fluid under pressure or to the reservoir; and
    a gear engagement control valve for selectively connecting each gear engagement actuator to the source of hydraulic fluid under pressure or to the reservoir; characterised by a changeover valve situated between the gear engagement control valve and the first and second gear engagement actuators, said changeover valve in a first position connecting the first gear engagement actuator to the gear engagement control valve and the second gear engagement actuator to the reservoir and, in a second position, connecting the second gear engagement actuator to the gear engagement control valve and the first gear engagement actuator to the reservoir, the changeover valve being shifted from its first position to its second position when pressure in the clutch actuator rises above a second predetermined valve, the second predetermined value being lower than the first predetermined value.

2. A hydraulic actuation system according to claim 1 wherein pressure above the first predetermined value is required to move the clutch to a touch point, at which the clutch begins transmit torque.

3. A hydraulic actuation system according to claim 1 wherein the first predetermined pressure value is about 10 bar.

4. A hydraulic actuation system according to claim 1 wherein the second predetermined pressure value is about 3 bar.

5. A hydraulic actuation system according to claim 1 wherein the clutch control valve is movable between:
    a first position in which the clutch actuator is connected to the reservoir and is isolated from the source of hydraulic fluid under pressure;
    a second position in which the clutch actuator is closed, thereby being isolated from both the reservoir and the source of hydraulic fluid under pressure; and
    a third position in which the clutch actuator is isolated from the reservoir and connected to the source of hydraulic fluid under pressure.

6. A hydraulic actuation system according to claim 1, wherein the gear engagement control valve is movable between:
    a rest position in which the first and the second working chamber of one of the gear engagement actuator are connected to the reservoir;
    a null position in which the first working chamber of one of the engagement actuators is connected to the source of hydraulic fluid under pressure and the second working chamber of the gear engagement actuator is closed;
    a third position in which the first and second working chamber of one of the gear engagement actuators are connected to the source of hydraulic fluid under pressure and isolated from the reservoir; and
    a fourth position in which the first working chamber of one of the gear engagement actuators is connected to the source of hydraulic fluid under pressure and the second working chamber of the gear engagement actuator is connected to the reservoir.

7. A hydraulic actuation system according to claim 6 wherein in the rest position, the gear engagement control valve closes the connection of the gear engagement actuator to the source of hydraulic fluid under pressure.

8. A hydraulic actuation system according to claim 6 wherein the gear engagement control valve in the rest position provides communication between an inlet of the clutch control actuator and an outlet of the changeover valve through an inlet and outlet of the clutch control valve, the gear engagement control valve in its null, second and third positions isolating the changeover valve from the clutch control actuator due to an inlet of the of the gear engagement control valve being shut off resulting in the outlet of the changeover valve being separated from the clutch control valve, whereby the outlet that leads into the input of the clutch control actuator is also separated.

9. A hydraulic actuation system according to claim 1 further including a pressure proportional valve for controlling the pressure of fluid delivered from the source of hydraulic fluid under pressure to the first and second gear engagement actuators.

10. A hydraulic actuation system according to claim 9 wherein, in a rest position, the pressure proportional valve closes the connection between the gear engagement actuators and the source of hydraulic fluid under pressure.

11. A hydraulic actuation system according to claim 9 wherein a first working chamber of one gear engagement actuator is selectively connected to the reservoir or to the pressure proportional valve via the gear engagement control valve, a second working chamber of the one gear engagement actuator being selectively connected to the reservoir or to the pressure proportional valve via the gear engagement control valve.

12. A hydraulic actuation system according to claim 1 wherein a gear engagement mechanism includes the two gear engagement actuators, a select actuator for moving a selector member in a first direction and a shift actuator for moving a selector member in a first direction and a shift actuator for moving the selector member in a second direction, the select and shift actuators being controlled by the common gear engagement control valve, through the changeover valve.

13. A hydraulic actuation system according to claim 1 wherein the clutch control valve comprises a spool slidably mounted in a bore, the spool having two circumferential lands which sealingly engage the bore, an inlet being provided to the bore for connection to the source of hydraulic fluid under pressure, an outlet from the bore being connected to reservoir; and a first port opening to the bore, the first port being connected to the clutch actuator:

in a first position of the spool, the first port being isolated from the inlet and connected to the outlet;

in a second position of the spool, the first port being isolated from both the inlet and outlet; and in a third position of the spool, the first port being connected to the inlet and isolated from the outlet.

14. A hydraulic actuation system according to claim 1 wherein the gear engagement control valve comprises a spool slidably mounted in a bore, the spool having three circumferential lands which sealingly engage the bore, an inlet being provided to the bore for connection to the source of hydraulic fluid under pressure; an outlet being provided from the bore for connection to the reservoir; and a first port opening to the bore, the first port being connected to a second working chamber of one gear engagement actuator, via the changeover valve, the spool having an axial bore opening to one end of the spool, the axial bore connecting with a cross bore opening between the first and second lands of the spool:

in a position other than a rest position of the spool, the inlet being connected to the outlet via the cross bore and the axial bore and the first port being connected to the outlet;

in a null position of the spool, the first port being closed and the inlet being isolated from the outlet;

in a third position of the spool, the first port being connected to the inlet and isolated from the outlet; and in a fourth position of the spool, the first port being connected to the outlet, the inlet being isolated from the first port and the outlet.

15. A hydraulic actuation system according to claim 14 wherein a second port opens to the bore of the gear engagement control valve;

in the rest position of the spool, the inlet being closed, the first port being connected to the outlet and the second port being connected to the outlet via the cross bore and axial bore;

in the null position of the spool, the first port being closed and the second port being connected to the inlet and isolated from the outlet;

in the third position of the spool, the first and second ports being connected to the inlet and isolated from the outlet;

in the fourth position of the spool, the first port being connected to the outlet and isolated from the inlet and the second port being connected to the inlet and isolated from the outlet.

16. A hydraulic actuation system according to claim 1 wherein the changeover valve comprises a spool slidably mounted in a bore, the spool having five axially spaced circumferential lands which sealingly engage the wall of the bore, an axial bore extending from one end of the spool to the other, the axial bore connecting with cross bores opening between the first and second lands and the third and fourth lands of the spool respectively, spring means acting on one end of the spool to bias it towards the opposite end of the bore and a hydraulic piston acting on the other end of the spool, hydraulic pressure from the clutch actuator being applied to the hydraulic piston to oppose the load applied by the spring means, the spring means being preloaded such that the spool will remain in a first position until pressure applied to the hydraulic piston exceeds the second predetermined value, the spool being switched to a second position before pressure applied to the hydraulic piston reaches the first predetermined value, an outlet being provided from the bore for connection of the bore to the reservoir and first to six ports connecting to the bore;

in the first position of the spool, the first and third ports and second and fifth ports being interconnected between adjacent lands which the fourth and sixth ports are connected to the outlet via the axial bore and cross bores;

in the second position of the spool, the first and fourth ports and second and sixth ports are interconnected between adjacent lands, which the third and fifth ports are connected to the outlet via the axial bore and cross bores.

17. A hydraulic actuation system for an automated twin clutch transmission system comprising;

a first active clutch for transmitting a torque via a first set of gears; and a second active clutch for transmitting torque via a second set of gears; wherein the clutches and gears are controlled by a pair of hydraulic actuation systems, each system being as claimed in claim 1, the hydraulic actuation systems being connected in parallel.

18. A hydraulic actuation system according to claim 17 wherein the hydraulic actuator systems for each of the clutches and associated gears have a common source of hydraulic fluid under pressure.

19. A hydraulic actuation system according to claim 18, wherein the hydraulic actuation systems have a common solenoid proportional pressure control valve.

20. A hydraulic actuation system according to claim 1 wherein a plurality of the components are defined by a common housing, the components being interconnected with one another in appropriate manner, by passageways formed in the common housing.

* * * * *